11/10/87 OR 4,705,345

United States Patent [19]

Ayliffe et al.

[11] Patent Number: 4,705,345

[45] Date of Patent: Nov. 10, 1987

[54] ADDRESSING LIQUID CRYSTAL CELLS USING UNIPOLAR STROBE PULSES

[75] Inventors: Peter J. Ayliffe, Stansted; Anthony B. Davey, Stortford, both of England

[73] Assignee: STC PLC, London, England

[21] Appl. No.: 847,347

[22] Filed: Apr. 2, 1986

Related U.S. Application Data

[63] Continuation-in-part of Ser. No. 782,796, Oct. 2, 1985, which is a continuation-in-part of Ser. No. 647,567, Sep. 6, 1984, Pat. No. 4,638,310.

[30] Foreign Application Priority Data

Apr. 3, 1985 [GB] United Kingdom ................. 8508712

[51] Int. Cl.[4] ......................... G02F 1/137; G09G 3/36

[52] U.S. Cl. ................................. 350/350 S; 340/784; 350/333

[58] Field of Search ..................... 350/350 S, 332, 333, 350/346, 330, 356; 340/784, 805, 811

[56] References Cited

U.S. PATENT DOCUMENTS

| | | | |
|---|---|---|---|
| 3,955,187 | 5/1976 | Bigelow | 340/784 |
| 3,995,942 | 12/1976 | Kawakami et al. | 340/784 |
| 4,044,346 | 8/1977 | Akahane et al. | 340/811 |
| 4,048,633 | 9/1977 | Sano | 350/332 |
| 4,060,801 | 11/1977 | Stein et al. | 350/346 |
| 4,109,241 | 8/1978 | Shanks | 350/333 X |
| 4,117,472 | 9/1978 | Freer et al. | 340/811 |
| 4,119,367 | 10/1978 | Raynes | 350/333 X |
| 4,378,557 | 3/1983 | Murata | 340/784 X |
| 4,404,555 | 9/1983 | Long et al. | 340/784 |
| 4,477,805 | 10/1984 | Arton et al. | 350/330 |
| 4,511,926 | 4/1985 | Crossland et al. | 340/784 |
| 4,571,585 | 2/1986 | Stein et al. | 350/346 |
| 4,591,886 | 5/1986 | Umeda et al. | 350/356 |
| 4,625,204 | 11/1986 | Clerc | 350/333 X |
| 4,639,089 | 1/1987 | Okada et al. | 350/350 S |

FOREIGN PATENT DOCUMENTS

| | | | |
|---|---|---|---|
| 0023291 | 3/1978 | Japan | 350/332 |
| 0037691 | 3/1979 | Japan | 340/805 |

*Primary Examiner*—Stanley D. Miller
*Assistant Examiner*—David Lewis
*Attorney, Agent, or Firm*—Lee, Smith & Zickert

[57] ABSTRACT

A method of addressing a matrix addressed ferroelectric liquid crystal cell is described that uses parallel entry of balanced bipolar data pulses on one set of electrodes to co-operate with serial entry of unipolar strobe pulses on the other set of electrodes. Data entry is preceded with blanking (erasing) pulses applied to the strobe lines. The polarity of the strobing and blanking pulses is periodically reversed to maintain charge balance in the long term.

8 Claims, 9 Drawing Figures

ADDRESSING LIQUID CRYSTAL CELLS USING UNIPOLAR STROBE PULSES

CROSS-REFERENCE TO RELATED APPLICATIONS:

This application is deemed to be a continuation in part of those previously filed, commonly assigned, co-pending U.S. Patent Applications specifically referenced in the "Background Art" and "Detailed Description" sections of the present application, namely, U.S. patent application Ser. No. 782,796 filed on Oct. 2, 1985 (W. A. Crossland et al: "Ferroelectric Liquid Crystal Display Cells") which is based on and claims priority from British Patent Application No. 8426976 field on Oct. 25, 1984 and U.S. patent application Ser. No. 647,567 filed on Sept. 6, 1984 (P. J. Ayliffe: "Method of Addressing Liquid Crystal Displays") which is based on and claims priority from U K Patent Specification No. 8324304 filed on Sept. 10, 1983 (now U K Pat. No. 2146473A).

In addition the subject matter of this application may relate to commonly assigned U.S. Patent Applications filed on even date herewith under attorney docket numbers P J Ayliffe et al 13-9-1 (Rev) and P J Ayliffe et al 14-10 (Rev), which are repectively entitled "Addressing Liquid Crystal Cells Using Bipolar Strobe Pulses" and "Addressing Liquid Crystal Cells Using Asymmetric Data Pulses" and which repectively claim priority principally from U K Patent Specification No. 8508713 filed on Apr. 3, 1985, and from U K Patent Specification No. 8508709 filed on Apr. 3, 1985.

To the extent the teachings of any of these related applications may be useful in the understanding and use of the present invention, they are hereby incorporated by reference.

Furthermore, Applications hereby affirm that, to the extent that the inventive entity for any of the claimed subject matter in any of the above-enumerated U S Patent Applications may differ from that for any invention claimed herein, both such inventive entities were under a legal obligation at the time their respective inventions were made to assign all rights in such inventions to a common assignee.

TECHNICAL FIELD

This invention relates to the addressing of liquid crystal cells and more particularly to the use of electrical pulses to address matrix arrays of ferroelectric liquid crystal cells.

BACKGROUND ART

In addition to dynamic scattering mode liquid crystal devices operated using a d.c. drive or an a.c. one, the prior art also includes field effect mode liquid crystal devices which have generally been operated using an a.c. drive in order to avoid performance impairment problems associated with electrolytic degradation of the liquid crystal layer and which have employed liquid crystals that interacts with an applied electric field by way of an induced dipole. As a result such field effect devices are not sensitive to the polarity of the applied field, but respond to the applied RMS voltage averaged over approximately one response time at that voltage. There may also be frequency dependence as in the case of so-called two-frequency materials, but this only affects the type of response produced by the applied field.

In contrast, a ferroelectric liquid crystal exhibits a permanent electric dipole, and it is this permanent dipole which will interact with an applied electric field. Ferroelectric liquid crystals are of potential interest in display, switching and information processing applications because they are expected to show a greater coupling with an applied field than that typical of a liquid crystal that relies on coupling with an induced dipole, and hence ferroelectric liquid crystals are expected to show a faster response. A ferroelectric liquid crystal display mode is described for instance by N. A. Clark et al in a paper entitled 'Ferro-electric Liquid Crystal Electro-Optics Using the Surface Stabilized Structure' appearing in Mol. Cryst. Liq. Cryst. 1983 Volume 94 pages 213 to 234. By way of example reference may also be made to an alternative mode that is described in commonly assigned U.S. patent application Ser. No. 782,796. W. A. Crossland et al "Ferroelectric Liquid Crystal Display Cells" which is based on and claims priority from British Patent Application No. 8426976. To the extent the teachings of any of these related publications and applications may be useful in the understanding and use of the present invention, they are hereby incorporated by reference.

DISCLOSURE OF INVENTION

In order to fully appreciate the advantages of the present invention, it should be understood that a particularly significant characteristic peculiar to ferroelectric smectic cells is the fact that they, unlike other types of liquid crystal cells, are responsive differently according to the polarity of the applied field. This characteristic sets the choice of a suitable matrix-addressed driving system for a ferroelectric smectic into a class of its own. A further factor which can be significant is that, in the region of switching times of the order of a microsecond, a ferroelectric smectic typically exhibits a relatively weak dependence on its switching time upon switching voltage. In this region the switching time of a ferroelectric may typically exhibit a response time proportional to the inverse square of applied voltage or, even worse, proportional to the inverse signal power of voltage. In contrast to this, a (non-ferroelectric) smectic A device, which in certain other respects is a comparable device exhibiting a long-term storage capability, exhibits in a corresponding region of switching speeds a response time that is typically proportional to the inverse fifth power of voltage. The significance of this difference becomes apparent when it is appreciated first that there is a voltage threshold beneath which a signal will never produce switching however long that signal is maintained; second that for any chosen voltage level above this voltage threshold there is a minimum time $t_S$ for which the signal has to be maintained to effect switching: and third that at this chosen voltage level there is a shorter minimum time $t_p$ beneath which the application of the signal voltage produces no persistent effect, but above which, upon removal of the signal voltage, the liquid crystal does not revert fully to the state subsisting before the signal was applied. When the relationship $t_S=f(V)$ between V and $t_S$ is known, a working guide to the relationship between V and $t_p$ is often found to be given by the curve $t_p=g(V)$ formed by plotting $(V_1, t_2)$ where the points ($V_1$, $t_1$ and $V_2$, $t_2$) lie on the $t_S=F(V)$ curve, and where $t_1=10t_2$. Now the ratio of $V_2/V_1$ is increased as the inverse dependence of switching time upon applied voltage weakens, and hence, when the working guide is applicable, a consequence of weakened dependence is an increased intolerance of the system to the incidence of wrong polarity signals to any pixel, that is signals tending to switch to the '1' state a pixel intended to be left in the '0' state, or to switch to the '0' state a pixel intended to be left in the '1' state.

Therefore, a good drive scheme for addressing a ferroelectric liquid crystal cell must take account of polarity, and may also need to take particular care to minimize the incidence of wrong polarity signals to any given pixel whether it is intended as '1' state pixel or a '0' state one. Additionally, the waveforms applied to the individual electrodes by which the pixels are addressed need to be charge-balanced at least in the long term. If the electrodes are not insulated from the liquid crystal this is so as to avoid electrolytic degradation of the liquid crystal brought about by a net flow of direct current through the liquid crystal. On the other hand, if the electrodes are insulated, such charge balancing will serve to prevent a cumulative build up of charge at the interface between the liquid crystal and the insulation.

According to the present invention there is provided a method of addressing a matrix-array type liquid crystal cell with a ferroelectric liquid crystal layer whose pixels are defined by the areas of overlap between the members of a first set of electrodes on one side of the liquid crystal layer and the members of a second set on the other side of the layer, in which method the pixels are addressed on a line-by-line basis after erasure, wherein unipolar blanking pulses are applied to the members of the first set of electrodes to effect erasure, wherein for selective addressing of the pixels unipolar strobing pulses are applied serially to the members of the first set of electrodes while charge balanced bipolar data pulses are applied in parallel to the members of the second set, the positive going parts being synchronized with the strobe pulse for one data significance and the negative going parts being synchronized with the strobe pulse for the other data significance, and wherein the polarities of the strobe and blanking pulses are periodically reversed to provide charge balance for the individual members of the first set of electrodes.

BRIEF DESCRIPTION OF DRAWINGS

The description refers to the accompanying drawings in which.

BEST MODE(S) FOR CARRYING OUT THE INVENTION

There follows a description of a ferroelectric liquid crystal cell and of a number of ways by which it may be addressed. With the exception of the first method, which has been included for the purposes of comparison, all these methods embody the present invention in preferred forms. The first method is one of the methods described in commonly assigned co-pending U.S. patent application serial No. 647,567 filed on September 6, 1984 under attorney docket number Ayliffe 8 (Rev) entitled "Method of Addressing Liquid Crystal Displays" and which is based on and claims priority from U K Patent Specification No. 8324304 filed on Sept. 10, 1983 (now U K Pat. No. 2146473A), the teachings of which being hereby incorporated by reference.

Figure 1:
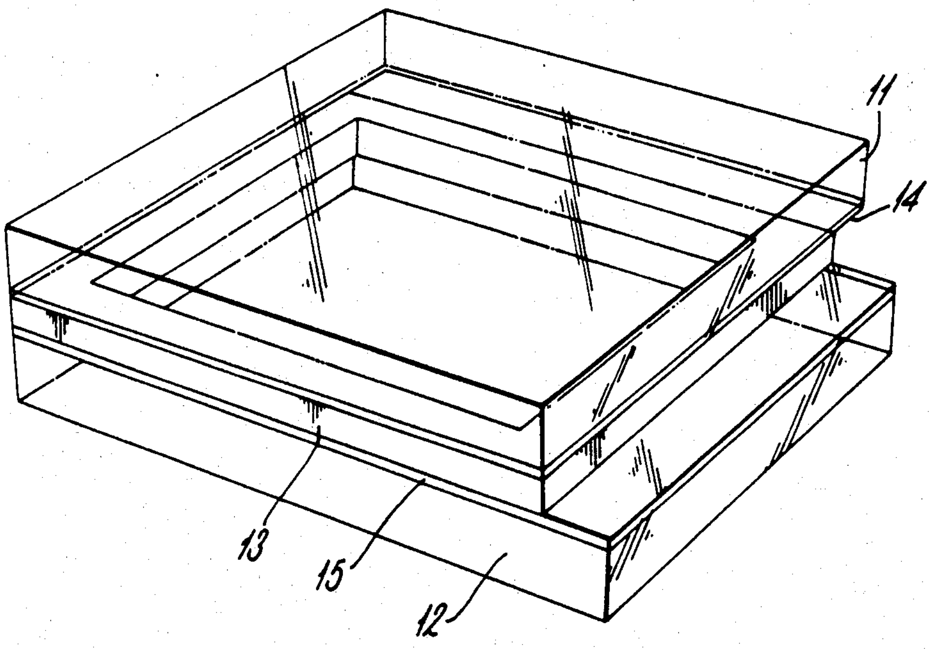
FIG. 1 depicts a schematic perspective view of an exemplary ferroelectric liquid crystal cell.

Referring now to FIG. 1 of the acompanying drawings, a hermetically sealed envelope for a liquid crystal layer is formed by securing together two glass sheets 11 and 12 with a perimeter seal 13. The inward facing surfaces of the two sheets carry transparent electrode layers 14 and 15 of indium tin oxide, and each of these electrode layers is covered within the display area defined by the perimeter seal with a polymer layer, such as polyimide (not shown), provided for molecular alignment purposes. Both polyimide layers are rubbed in a single direction so that when a liquid crystal is brought into contact with them they will tend to promote planar alignment of the liquid crystal molecules in the direction of the rubbing. The cell is assembled with the rubbing directions aligned parallel with each other. Before the electrode layers 14 and 15 are covered with the polymer, each one is patterned to define a set of strip electrodes (not shown) that individually extend across the display area and on out to beyond the perimeter seal to provide contact areas to which terminal connection may be made. In the assembled cell the electrode strips of layer 14 extend transversely of those of layer 15 so as to define a pixel at each elemental area where an electrode strip of layer 15 is overlapped by a strip of layer 14. The thickness of the liquid crystal layer contained within the resulting envelope is determined by the thickness of the perimeter seal, and control over the precision of this may be provided by a light scattering of short lengths of glass fiber (not shown) of uniform diameter distributed through the material of the perimeter seal. Conveniently the cell is filled by applying a vacuum to an aperture (not shown) through one of the glass sheets in one corner of the area enclosed by the perimeter seal so as to cause the liquid crystal medium to enter the cell by way of another aperture (not shown) located in the diagonally opposite corner. (Subsequent to the filling operation the two apertures are sealed.) The filling operation is carried out with the filling material heated into its isotropic phase as to reduce its viscosity to a suitably low value. It will be noted that the basic construction of the cell is similar to that of for instance a conventional twisted nematic, except of course for the parallel alignment of the rubbing directions.

Typically the thickness of the perimeter seal 13, and hence of the liquid crystal layer, is about 10 microns, but thinner or thicker layer thicknesses may be required to suit particular applications depending for instance upon whether or not bistability of operation is required and upon whether the layer is to be operated in the $S_C{}^*$ phase or in one of the more ordered phases such as $S_I{}^*$ or $S_F{}^*$.

Figure 2:
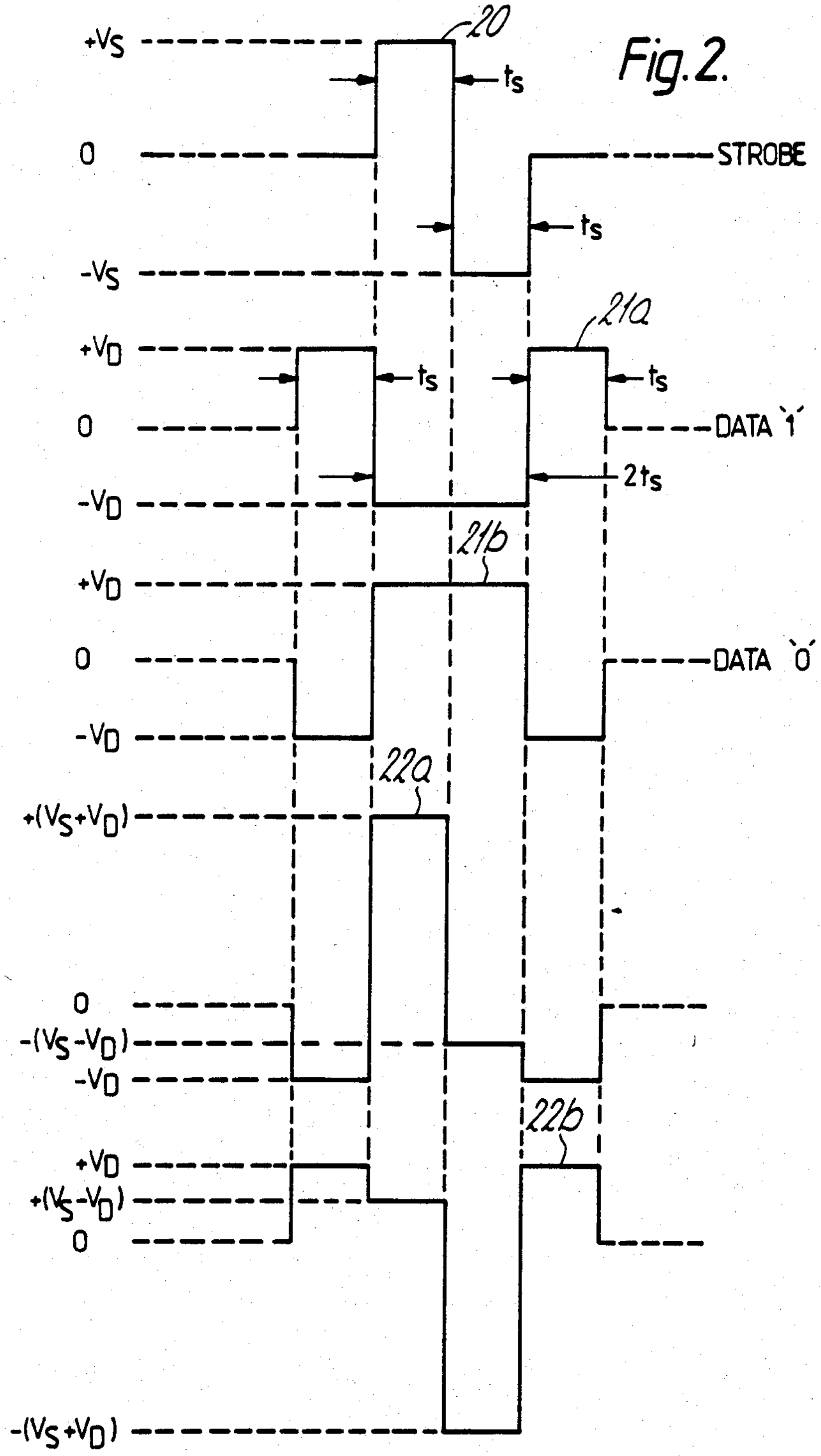
FIG. 2 depicts the waveforms of a previously disclosed drive scheme which may be used to drive the cell of FIG. 1, and FIG. 3 to 9 depict the waveforms of seven alternative drive schemes embodying the invention in preferred forms which may also be used to drive the cell of FIG. 1.

Some drive schemes for ferroelectric cells are described in the above-referenced commonly assigned co-pending U.S. patent application Ser. No. 647,567 filed on Sept. 6, 1984 under attorney docket number Ayliffe 8 (Rev). Among these is a scheme that is described with particular reference to FIG. 1 of that specification, a part of which has been reproduced herein in slightly modified form as FIG. 2. This employs bipolar data pulses 21*a*, 21*b* to co-act with unipolar strobe pulses 20. The strobe pulses 20 are applied serially to the electrode strips of one electrode layer, while the data pulses 21*a*, and 21*b* are applied in parallel to those of the other layer. In this particular scheme the unipolar nature of the strobe pulses dictates that pixels are capable of being switched by these pulses in one direction only. Accordingly, some form of blanking is required between consecutive addressings of any pixel. In the description of the referenced application it is suggested that this may take the form of a pulse (not shown) applied to the strobe line which is of opposite polarity to that of the strobe pulses.

A pixel is switched on by the coincidence of a voltage excursion of $V_S$, of duration $t_S$, on its strobe line with a voltage excursion of $-V_D$, for an equal duration, on its data line. These two voltage excursions combine to produce a switching voltage of $(V_S+V_D)$ for a duration of $t_S$. Since the switching voltage threshold for duration $t_S$ is close to $(V_S+V_D)$, a blanking pulse applied to the strobe lines without any corresponding voltage excursion on the data lines will not be sufficient to achieve the requisite blanking if it is of amplitude $V_S$ and duration $t_S$. Therefore, if no voltage is to be applied to the data lines, the amplitude of the blanking pulse must be increased to $(V_S+V_D)$, or its duration must be extended beyond $t_S$. Both these options have the undesired effect of removing charge balance from the strobe lines.

Figure 3:
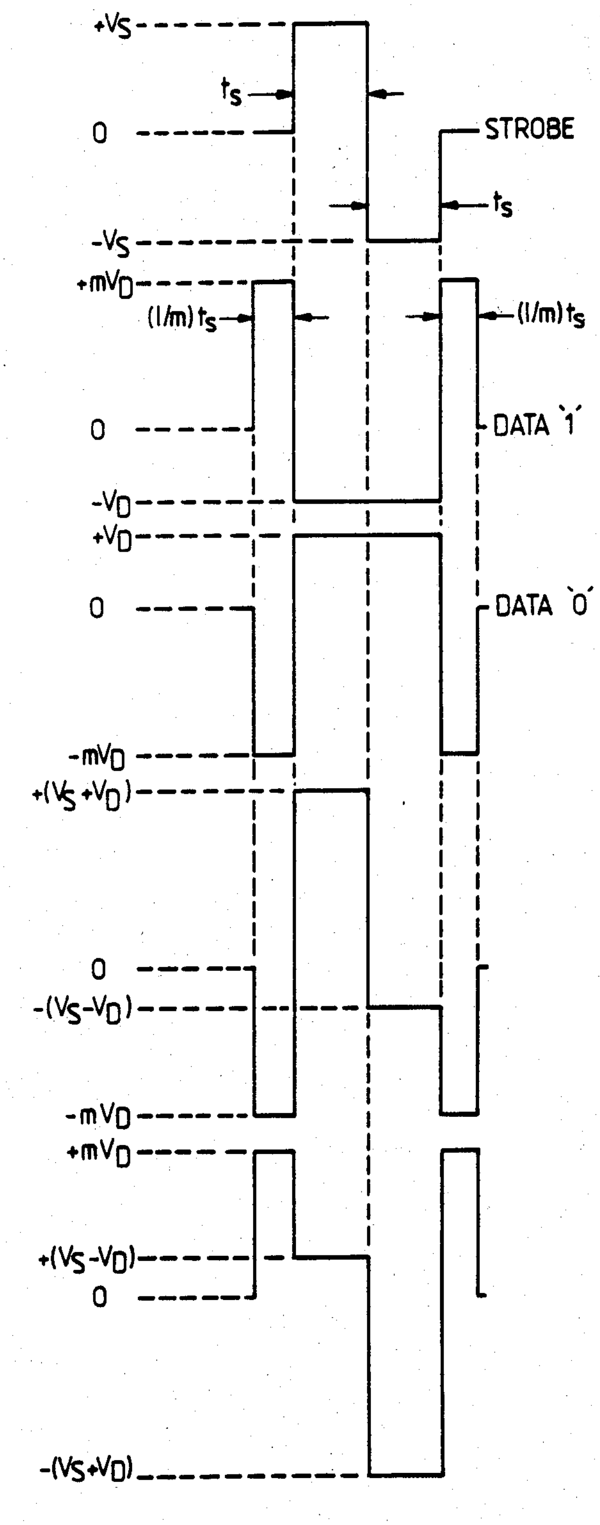

Attention will now be turned to FIG. 3 which depicts waveforms according to one preferred embodiment of the present invention. Blanking, strobing, data '0' and data '1' waveforms are depicted respectively at 30, 31, 32 and 33.

As before, the data pulse waveforms are applied in parallel to the electrode strips of one of the electrode layers 14, 15, while strobe pulses are applied serially to those of the other electrode layer. The blanking pulses are applied to the set of electrode strips to which the strobe pulses are applied. These blanking pulses may be applied to each electrode strip in turn, to selected groups in turn, or to all strips at once according to specific blanking requirements.

The data pulses 32 and 33 are balanced bipolar pulses, each having positive and negative going excursions of magnitude $|V_D|$ and duration $t_S$ to give a total duration $2t_S$. If the operating constraints allow consecutive lines to be addressed without interruption, then unaddressed pixels receiving consecutive data pulses may see a data 1 followed immediately by a data '0', or alternatively a data '0' followed immediately by a data '1'. In either instance the liquid crystal layer at such a pixel will be exposed to a potential difference of $V_D$ for a period of $2t_S$. Therefore, a magnitude of $V_D$ must be set so that this is insufficient to effect switching from either data state to the other.

The first illustrated strobe pulse 31*a* is a positive going unipolar pulse of amplitude $V_S$ and duration $t_S$. All strobe pulses are synchronized with the first half of their corresponding data pulses. (They could alternatively have been synchronized with the second halves, in which case the data significance of the data pulse waveforms is reversed.) The liquid crystal layer at each pixel addressed by that data pulse will, for the duration of that strobe pulse, be exposed to a potential difference of $(V_S-V_D)$ if that pixel is simultaneously addressed with a data '1' waveform. The magnitudes of $V_S$ and $V_D$ are chosen so that $(V_S+V_D)$ applied for a duration $t_S$ is sufficient to effect switching, but $(V_S-V_D)$, and $V_D$, both for a similar duration $t_S$, are not.

The data pulses are thus seen to be able to switch the pixels in one direction only, and hence, before they are addressed, they need to be set to the other state by means of blanking pulses 30. The blanking pulse preceding any strobing pulse needs to be of the opposite polarity to that of the strobing pulse. Thus positive going strobe pulses 31*a* are preceded by negative going blanking pulses 30*a*, while negative going strobe pulses 31*b* are preceded by positive going blanking pulses 30*b*. Each blanking pulse is of sufficient amplitude and duration to set the electrode strip or strips to which it is applied into data '0' or '1' state as dictated by polarity. It may for instance be of magnitude $|V_S+V_D|$ and duration $t_S$, but a shorter or longer duration pulse, with corresponding increased or reduced amplitude, may be preferred to suit specific requirements.

The first blanking pulse of FIG. 3 is a negative going pulse which sets the pixels to which it is applied into the data '0' state. If it is applied to only one electrode strip, then a fresh blanking pulse will be required before the next strip is addressed with a strobing pulse, whereas if the blanking pulse is applied in parallel to group of electrode strips, or to the whole set of electrode strips of that electrode layer 14 or 15, then each one of the strips which have been blanked can be serially addressed once with an individual strobe pulse before the next blanking pulse is required. Periodically the polarity of the blanking pulse is reversed, directly after which the polarity of the succeeding strobe pulse or pulses is also reversed. Such polarity reversals may occur with each consecutive blanking of any given electrode strip, or such a strip may receive a small number of blanking pulses and addressings with strobe pulses before it is subject to a polarity reversal. The periodic polarity reversals may be effected on a regular basis with a set number of addressings between each reversal, or it may be on a random basis. A random basis is indicated for instance when the blanking pulses are applied to selected groups of strips, and a facility is provided that enables the sizes of those groups to be changed in the course of data refreshing. These polarity reversals ensure that in the course of time each strip is individually addressed with equal numbers of positive going and negative going blanking pulses. A consequence of this is that each strip is also addressed with equal number of positive going and negative going strobe pulses. Hence, over a period of several addressings charge balance is maintained.

Previously it was suggested that if the blanking pulse were to have a duration $t_S$, it should have a magnitude $|V_S+V_D|$ in order to be sufficient effect blanking. This is true if the set of electrodes strips to which the blanking pulses are not applied are kept at zero volts when the blanking pulses are applied to the other set of electrodes. The blanking pulse voltage can however in certain circumstances be reduced to $V_S$ without expanding the duration provided that, while this is applied to (selected) members of one set of strips, it is synchronized with an oppositively directed voltage excursion of $-V_D$ applied to all the members of the other set of strips. This introduces a momentary charge imbalance on the individual members of this other set of strips, but in the longer term this is removed by the periodic inversion of the polarity of the blanking pulses.

When an electrode strip is addressed with a negative going blanking pulse 30*a* the pixels associated with that strip are all set into the data '0' state. The succeeding strobe pulse is a positive going pulse 31*a*. The only data pulse to co-operate with a positive going strobe pulse to develop a potential difference of $(V_S+V_D)$ across the liquid crystal layer is a data '1' waveform 33. When however, the strip is addressed with a positive going blanking pulse 30*b*, the pixels associated with that strip are set into the data '1' state. The succeeding strobe pulse 31b is negative going. This co-operates with the data '1' waveform 33 to develop a potential difference of $(V_S-V_D)$ across the liquid crystal layer, and hence the effect upon pixels addressed with this data waveform is to leave those pixels in the data '1' state. Thus, it is seen that the data significance of the two data waveforms is invariant under change of polarity of the strobe and blanking pulse waveforms.

Figure 4:
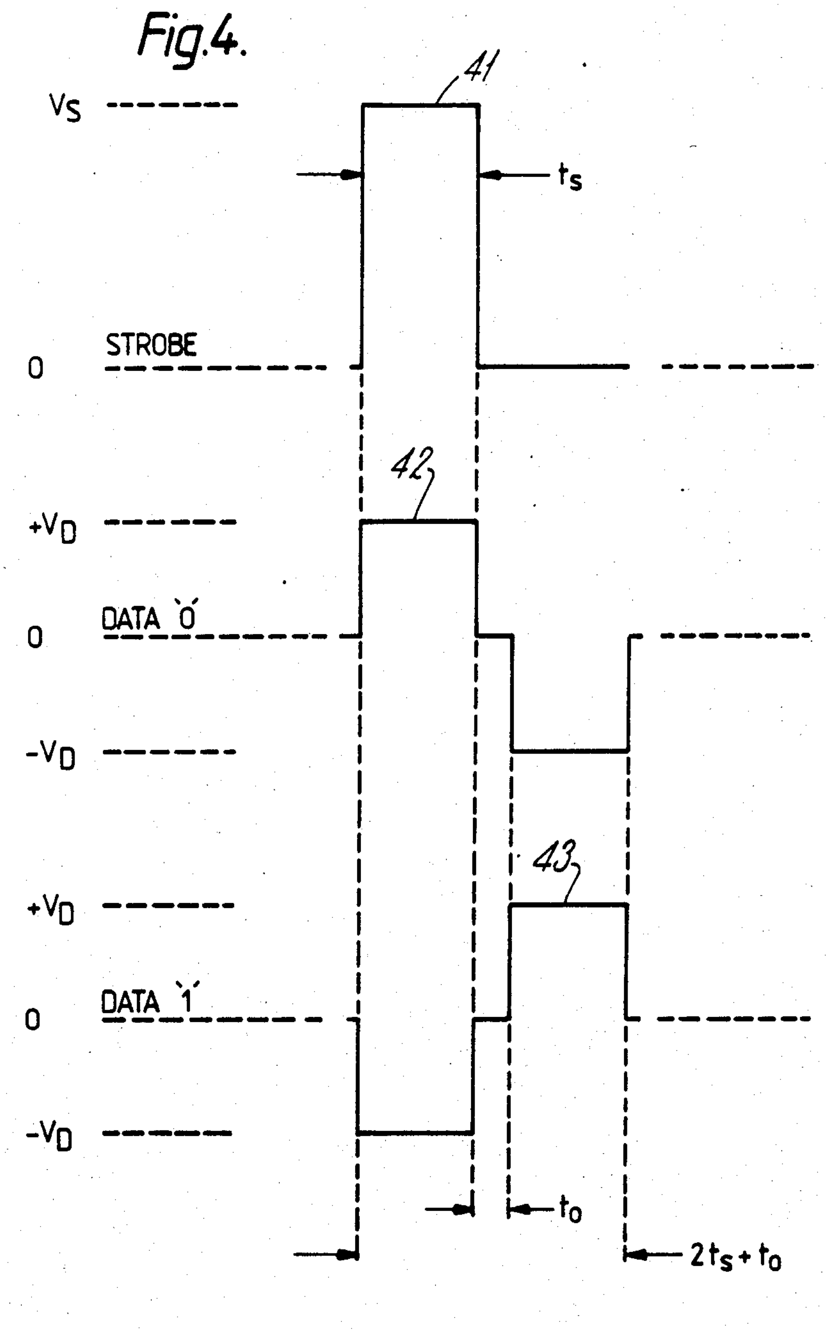

When using the pulse waveforms of FIG. 3 for addressing a ferroelectric cell in a frame blanking mode in which the blanking pulse is applied in parallel to all the electrode strips of one of the electrode layers 14, 15, the minimum line address time is seen to be $2t_S$. There is then an interval between frames to allow for frame blanking. The minimum value of the line address time $2t_S$ is related to the choice of the full switching voltage $(V_S+V_D)$. It has been found however, that in some circumstances the minimum conditions for achieving switching are adversely affected if the switching stimulus is immediately followed by a stimulus of the opposite polarity. This is the situation prevailing when using the data entry waveforms of FIG. 3. Each time a pixel is switched by strobe and data pulse waveforms co-operating to produce a potential difference across the liquid crystal layer of $(V_S+V_D)$, this is immediately followed by an oppositely directed potential difference of $V_D$. At least under some conditions the switching criteria can be somewhat relaxed, for instance to allow a shortening of the duration $t_s$, or a reduction of the switching voltage $V_S+V_D$. This may be achieved by introducing a gap of duration $t_{01}$ between the two halves of the data pulse waveforms 42 and 43 as depicted in FIG. 4. In all other respects the waveforms are the same as those depicted in FIG. 3. The corresponding strobe pulse waveform 41 still has its leading and trailing edges synchronized with the leading and trailing edges of the parts of the data pulses preceding the zero voltage gaps $t_{01}$. Typically the duration $t_{01}$ is approximately 60% of the duration $t_S$. It should be noted however, that any relaxation of the switching criteria afforded by this introduction of the zero voltage gap between the positive and negative going parts of the data pulse waveforms is achieved at the expense of increasing the line address time from $2t_S$ to $(2t_S+t_{01})$.

A similar effect has also been found upon occasion where switching response has been adversely affected by a reverse polarity stimulus that immediately precedes the switching stimulus. This is alleviated by including a further gap of $t_{02}$ (not shown) to precede the first halves of the data pulses, thereby increasing the line address time to $(2t_S+t_{01}+t_{02})$. The durations of $t_{01}$ and $t_{02}$ may be the same, but are not necessarily so.

Examination of the switching characteristics of certain ferroelectric cells has revealed that it is possible in some circumstances to modify the data pulse waveforms of FIG. 3 to achieve a line address time of less than $2t_S$. The modified data '0' and data '1' waveforms are depicted respectively at 52 and 53 in FIG. 5. The parts before the zero-crossing are unchanged: they are synchronized with the strobe pulse of magnitude $|V_S|$ and duration $t_S$, and are themselves of magnitude $|V_D|$ and duration $t_S$. For each type of data pulse the voltage excursion of the second part, the part after the zero-crossing, is m times that of the first part, but charge balance is restored by reducing the duration of the second part by a factor m in relation to the duration of the first. The factor m is typically not more than 3. The line address time is reduced by the use of these asymmetric waveforms from $2t_S$ to $(1+1/m)t_S$.

Figure 5:
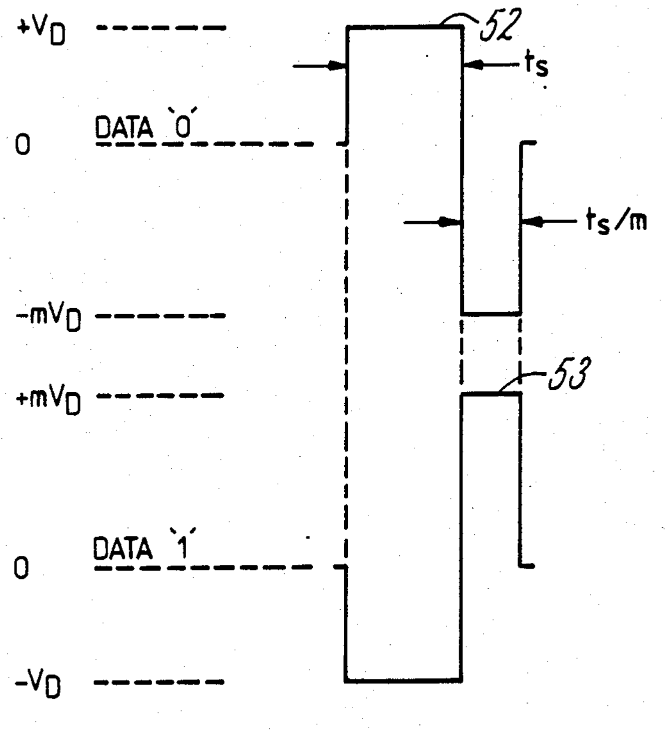
Figure 6:
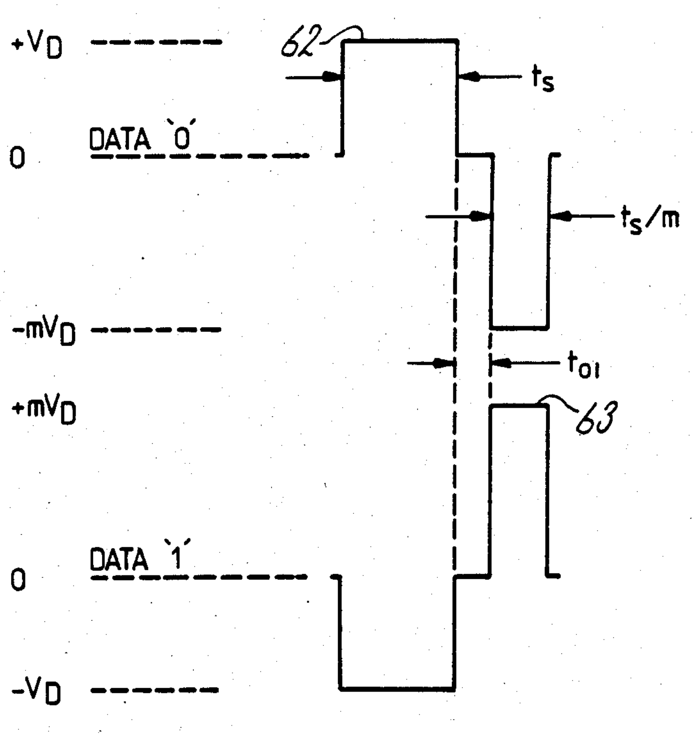

The FIG. 5 data entry waveforms involve following a switching stimulus immediately with a second stimulus of opposite polarity. This can be avoided by incorporating a short duration gap between the two parts of the data waveforms after the manner previously described with reference to FIG. 4. This produces the '0' and '1' data waveforms 62 and 63 of FIG. 6. The line address time in this instance is $(1+1/m)t_S+t_{01}$.

When operating a ferroelectric cell of n lines with waveforms as depicted in FIGS. 3, 4, 5 or 6, if the line address time is $t_L$ and the blanking time is $t_B$, then the time taken to refresh a whole frame is $nt_L+t_B$ when the cell is operated in frame blanking mode. However, if it were operated in line blanking mode in which each line is individually blanked, the refresh time is expanded to $n(t_L+t_B)$. This problem is avoided with the waveforms of FIG. 7. This uses a modified form of strobe pulses 71 the first part of which functions to blank one line during the data entry for the preceding line.

The strobe pulses 71 are bipolar pulses, but are individually unbalanced and therefore exist in two forms 71a and 71b which are the inverse of each other and are periodically alternated to provide charge balance in the long term. Strobe pulse 71a is negative going to a voltage $-V_S$ for a duration $2t_S$, is then immediately positive going to a voltage $+V_S$ for a duration $t_s$ and then remains at zero volts for a further duration $t_s$. The co-operating '0' an '1' data pulses 72 and 73 are identical with those of FIG. 3, being balanced bipolar pulses ranging from $+V_D$ to $-V_D$, and of total duration $2t_S$. The leading edges of the strobe pulses are synchronized with those of the data pulses so that a data pulse that is synchronized with the first half of a strobe pulse applied to electrode strip 'p' is also synchronized with the second half of the strobe pulse applied to electrode strip $(p-1)$. From a study of these waveforms of FIG. 7 it is seen that a data '0' synchronized with the first half of the first type of strobe pulse 71a will set a pixel to the '0' state in the first half of that data '0', and leave it in the '0' state for the second half. If on the other hand the data waveform was that of a data '1' pulse, then the pixel would not be switched in the first half of that data pulse waveform, but would be set into the '0' state by the second half of the data pulse. Then the next data pulse will co-operate with the second half of the strobe pulse waveform to set the pixel into the data '1' state if that next data pulse is a data '1' pulse, but will leave it in the data '0' state if it is a data '0'. Similarly, it will be seen that with the second type of strobe pulse 71b a pixel is set into the data '1' state by a data pulse synchronized with the first half of the strobe pulse, and is left in that '1' state if the next data pulse is a data '1' pulse, but will be restored to the '0' state if that next data pulse is a data '0' pulse waveform. Typically, the strobe pulse waveforms 71a and 71b are alternated with each frame.

Figure 7:
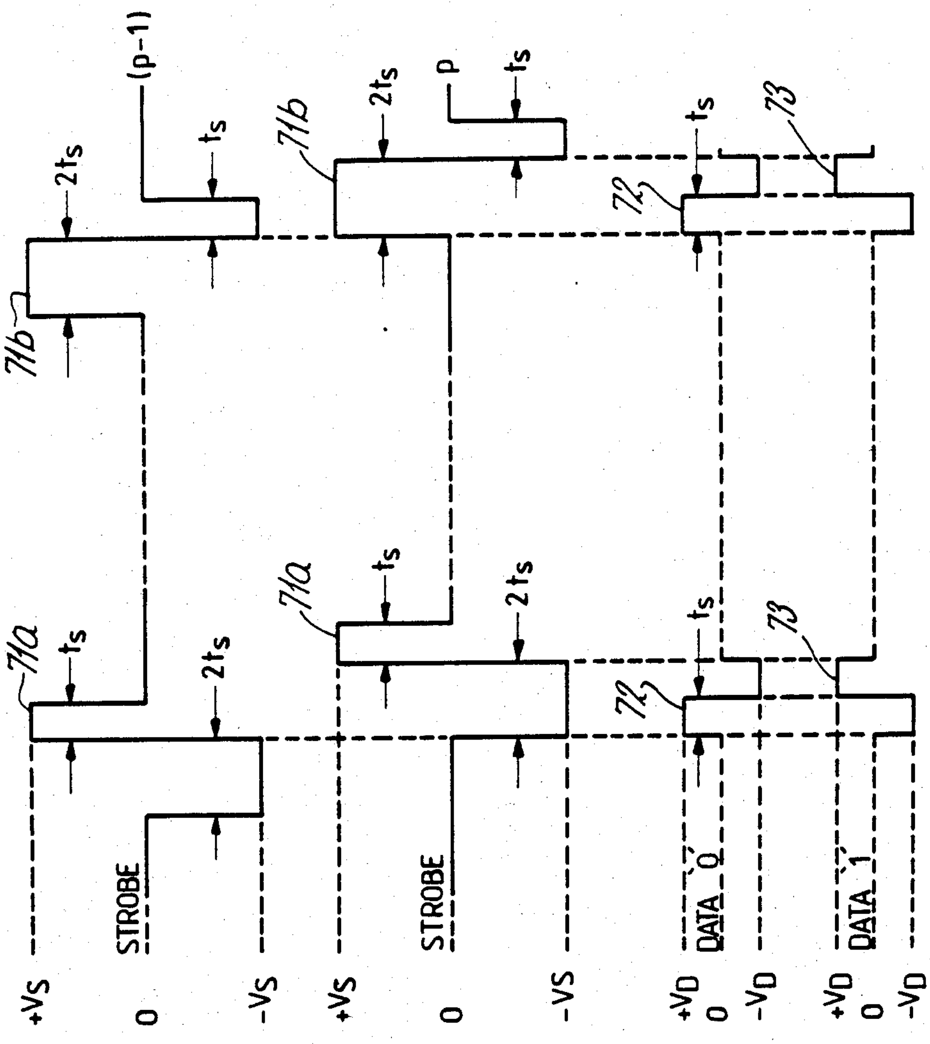
Figure 8:
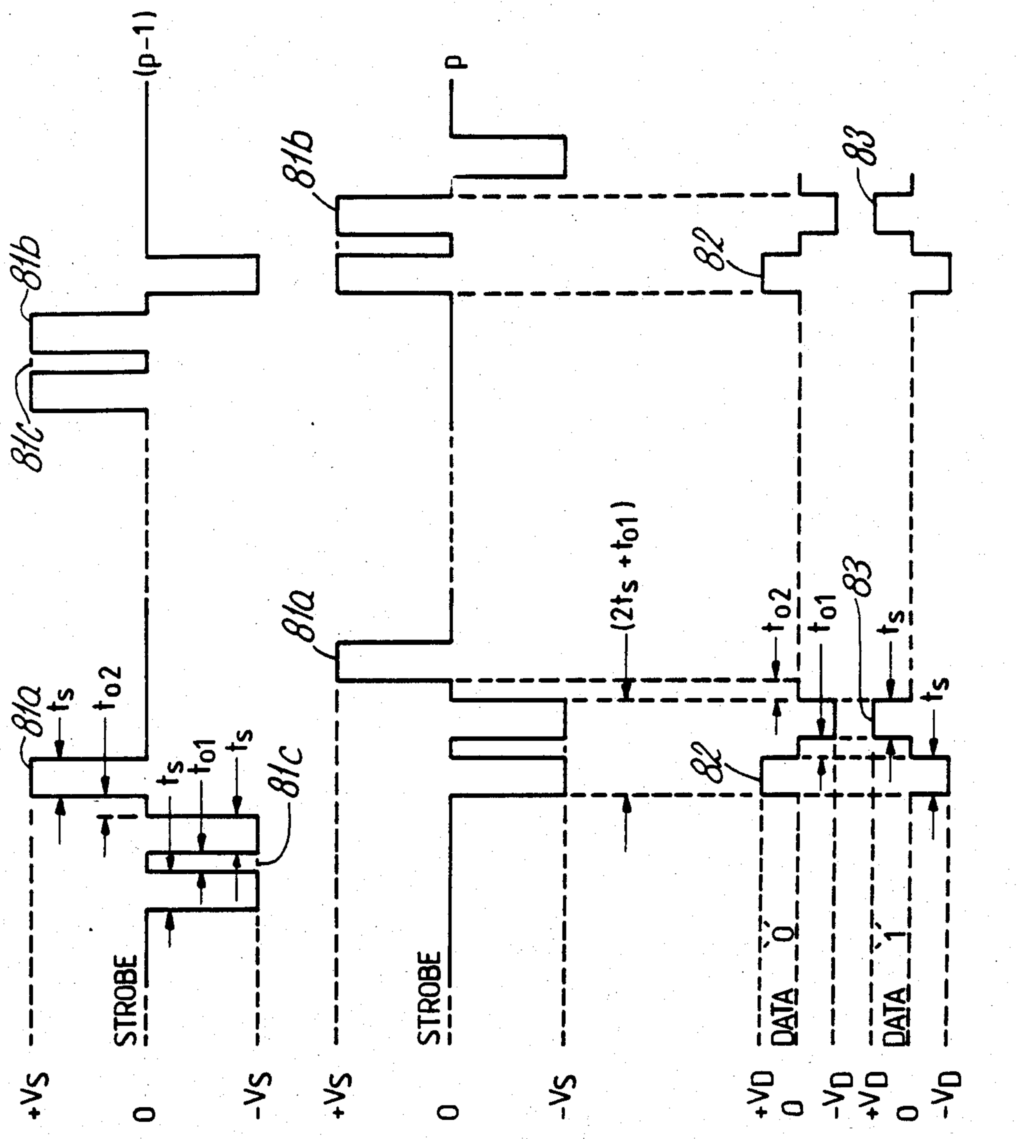

The waveforms of FIG. 7 illustrate another example of drive system in which a switching stimulus is immediately followed by a stimulus of opposite polarity. Hence it is another example of a system that can be modified to introduce gaps in the waveforms which separate the reverse polarity stimulus from the switching stimulus by a short duration period during which no field is maintained across the liquid crystal layer. The resulting waveforms are depicted in FIG. 8. The data '0' and data '1' pulse waveforms 82 and 83 each have a zero voltage gap of duration $t_{01}$ inserted between their first and second halves which remain of amplitude $V_D$ and duration $t_S$. Additionally, a zero voltage of duration $t_{02}$ is introduced between consecutive data waveforms. The durations of $t_{01}$ and $t_{02}$ may be the same, but are not necessarily so. Corresponding gaps are also inserted into the strobe pulse waveforms 81*a* and 81*b*. Since however, the potential across the liquid crystal is not reversed at a pixel between the first and second parts of the strobe pulse, there is no need for the strobe potential to return to zero for the period $t_{01}$ between these two parts, and it may be found more convenient to maintain the potential for the full period of $(2t_S+t_{01})$ as indicated by broken lines 81*c*.

Figure 9:
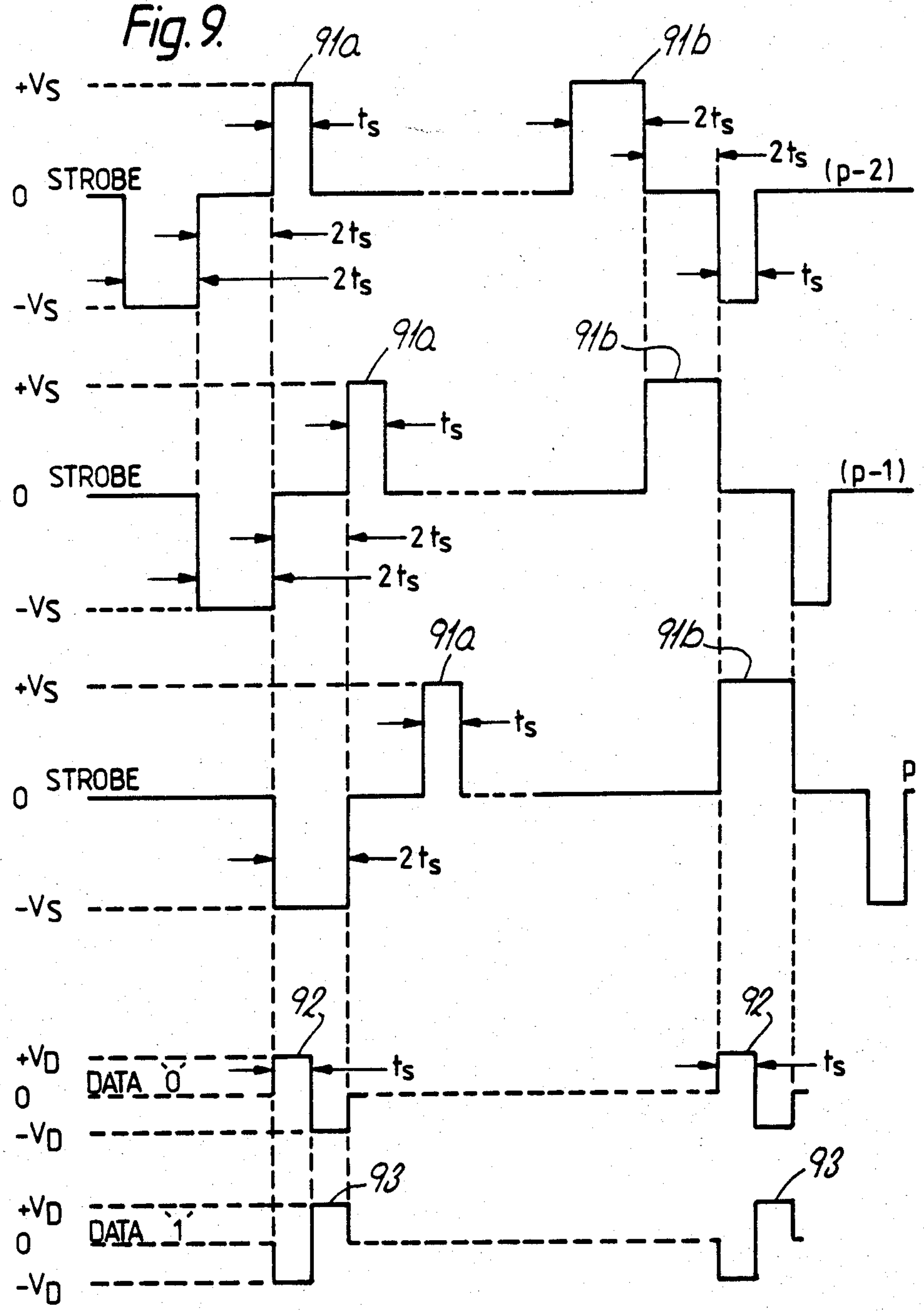

Alternatively the line blanking may be performed more than one line in advance of the data entry as for instance depicted in FIG. 9. As before, strobe pulses 91*a* and 91*b*, which are the inverse of each other, are periodically alternated to provide charge balance in the long term. Strobe pulse 91*a* has a total duration of $6t_S$. In the first third it is negative going to a voltage $-V_S$ for a duration $2t_S$. In the second third it remains at zero volts for the whole duration $2t_S$, and in the final third it is first positive going to a voltage $+V_S$ for a duration $t_S$ and then reverts to zero volts for the final duration $t_S$. The co-operating '0' and '1' data pulses 92 and 93 are identical with those of FIG. 3, being balanced bipolar pulses ranging from $+V_D$ to $-V_D$, and of total duration $2t_S$. The leading edges of the strobe pulses are synchronized with those of the data pulses so that a data pulse that is synchronized with the first third of a strobe pulse applied to electrode strip 'p' is also synchronized with the middle third of the strobe pulse applied to electrode strip (p−1), and with the final third of the strobe pulse applied to electrode strip (p−2). From a study of these waveforms it is seen that the first third of a strobe pulse 91*a* will set a pixel into '0' state whether it is synchronized with a '0' data pulses or a '1' data pulse: that in the second third the voltages are insufficient for switching; and that in the final third is synchronized wiht a data '0' pulse waveform, but will be restored to the '1' state if it is synchronized with a data '1' waveform.

A line is then blanked for two line address times before being written instead of for only one line address time provided by the waveforms of FIG. 7. However, whereas with the waveforms of FIG. 7 data entry that induces switching of a pixel in a period $t_S$ can be preceded by exposure of that pixel in the immediately preceding period of duration $t_S$ by an opposite polarity stimulus of magnitude $|V_S+V_D|$, with the waveforms of FIG. 9 the maximum reverse polarity stimulus that can occur in this period $t_S$ immediately preceding the data entry switching is a reverse polarity stimulus of magnitude $|V_D|$.

Although the present invention has thus been described with particular reference to one or more presently preferred embodiments, doubtless other embodiments will be apparent to the skilled artisan without departing from the spirit and intent of the present invention. Accordingly, the invention should be deemed to encompass all possible embodiments falling within the scope of the appended claims, as well as any equivilent thereof.

We claim:

1. A method of addressing a matrix-array type liquid crystal cell having a ferroelectric liquid crystal layer whose pixels are defined by the areas of overlap between the members of a first set of electrodes on one side of the liquid crystal layer and the members of a second set on the other side of the layer, in which method:

(a) the pixels are addressed on a line-by-line basis after erasure, (b) unipolar blanking pulses are applied to the members of the first set of electrodes whereby erasure is effected.

(c) unipolar strobing pulses are applied serially to the member of the first set of electrodes while charge balanced bipolar data pulses are applied in parallel to the members of the second set, the positive going parts being synchronized with the strobe pulse for one data significance and the negative going parts being synchronized with the strobe pulse for the other data significance, whereby the pixels may be selectivly addressed, and (d) the polarities of the strobe and blanking pulses are periodically reversed, whereby charge balance for the individual members of the first set of electrodes may be provided.

2. A method as claimed in claim 1, wherein said polarities of said strobe and blanking pulses are periodically reversed on a regular basis.

3. A method as claimed in claim 1, wherein the polarities of said strobe and blanking pulses are periodically reversed on a random basis.

4. A method as claimed in claim 1 wherein a gap separates the positive and negative going portions of each balanced bipolar data pulse.

5. A method as claimed in claim 1 wherein a gap always precedes or follows each data pulse.

6. A method as claimed in claim 1 wherein the positive and negative going portions of each balanced bipolar data pulse are asymmetric, one part having m times the amplitude of the other and $1/m^{th}$ the duration, m being a constant other than 1.

7. A method as claimed in claim 1 wherein the blanking pulses and strobing pulses are combined so that, while the strobing part of one of the thus combined blanking and strobing pulses is being used for data entry on one line, the same data co-operates with the blanking part of the succeeding, and partially overlapping in time, combined blanking and strobing pulse to effect blanking of a succeeding line.

8. A method as claimed in claim 7, wherein said succeeding line is the next succeeding line.

* * * * *